US012794067B2

(12) United States Patent
Wu et al.

(10) Patent No.: US 12,794,067 B2
(45) Date of Patent: Nov. 10, 2026

(54) MOUNTING STRUCTURE FOR ELECTRIC VEHICLE

(71) Applicant: Ford Global Technologies, LLC, Dearborn, MI (US)

(72) Inventors: Fubang Wu, Woodhaven, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1023 days.

(21) Appl. No.: 17/859,754

(22) Filed: Jul. 7, 2022

(65) Prior Publication Data

US 2024/0014496 A1 Jan. 11, 2024

(51) Int. Cl.

*H01M 50/249* (2021.01)
*B60K 1/04* (2019.01)
*H01M 50/242* (2021.01)
*H01M 50/262* (2021.01)

(52) U.S. Cl.

CPC ............. *H01M 50/249* (2021.01); *B60K 1/04* (2013.01); *H01M 50/242* (2021.01); *H01M 50/262* (2021.01); *B60K 2001/0438* (2013.01); *H01M 2220/20* (2013.01)

(58) Field of Classification Search

CPC . H01M 50/249; H01M 50/262; H01M 50/242
See application file for complete search history.

(56) References Cited

U.S. PATENT DOCUMENTS

| | | | | |
|---|---|---|---|---|
| 1,173,616 | A * | 2/1916 | Stone | B60L 50/64 180/68.5 |
| 11,148,520 | B2 | 10/2021 | Chu et al. | |
| 2016/0359206 | A1* | 12/2016 | Eberleh | H01M 10/425 |
| 2017/0141368 | A1* | 5/2017 | Ricci | B60L 53/52 |
| 2021/0114449 | A1* | 4/2021 | Chu | H01M 50/236 |

FOREIGN PATENT DOCUMENTS

| | | |
|---|---|---|
| CN | 211350780 | 8/2020 |
| CN | 212242936 | 12/2020 |
| CN | 213752893 | 7/2021 |
| DE | 102016223220 | 5/2018 |

OTHER PUBLICATIONS

Machine Translation of: Chen et al., CN 211350780U, Aug. 25, 2020.*

* cited by examiner

*Primary Examiner* — Kenneth J Douyette
(74) *Attorney, Agent, or Firm* — Burris Law, PLLC

(57) ABSTRACT

A mounting structure for mounting a battery tray to a frame of a vehicle includes a shear plate and a plurality of discrete mounting blocks. The shear plate extends in a longitudinal direction of the vehicle. The plurality of discrete mounting blocks are mounted onto the shear plate between the shear plate and a bottom cover of the battery tray. Each mounting block of the plurality of discrete mounting blocks includes a plurality of walls that define one or more cavities. The discrete mounting blocks includes a set of first mounting blocks located proximate a first side of the shear plate and a set of second mounting blocks located proximate a second side of the shear plate that is opposite the first side of the shear plate.

20 Claims, 8 Drawing Sheets

MOUNTING STRUCTURE FOR ELECTRIC VEHICLE

FIELD

The present disclosure relates to a mounting structure for an electric vehicle, and an electric vehicle including a mounting structure.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses these and other issues related to the integration of rechargeable battery packs in electric vehicles.

SUMMARY

This section provides a general summary of the disclosure and is not a comprehensive disclosure of its full scope or all of its features.

In one form, the present disclosure provides a mounting structure for mounting a battery tray to a frame of a vehicle. The mounting structure includes a shear plate and a plurality of discrete mounting blocks. The shear plate extends in a longitudinal direction of the vehicle. The plurality of discrete mounting blocks are mounted onto the shear plate between the shear plate and a bottom cover of the battery tray. Each mounting block of the plurality of discrete mounting blocks includes a plurality of walls that define one or more cavities. The discrete mounting blocks includes a set of first mounting blocks located proximate a first side of the shear plate and a set of second mounting blocks located proximate a second side of the shear plate that is opposite the first side of the shear plate.

In variations of the mounting structure of the above paragraph, which can be implemented individually or in any combination: the first mounting blocks are aligned with each other in the longitudinal direction of the vehicle and the second mounting blocks are aligned with each other in the longitudinal direction of the vehicle; the first side corresponds to a left side of the vehicle and the second side corresponds to a right side of the vehicle, each first mounting block is laterally aligned with a respective second mounting block that is located on an opposite side of a longitudinal axis of the vehicle; the mounting structure includes a plurality of tray fasteners, each fastener extending through the shear plate and a respective discrete mounting block of the plurality of discrete mounting blocks and configured to extend through the bottom cover of the battery tray to secure the shear plate, the respective discrete mounting block, and the battery tray to each other; a plurality of frame fasteners, each frame fastener extending through the shear plate and a corresponding discrete mounting block of the plurality of discrete mounting blocks and configured to extend through a longitudinal rail of a vehicle frame to secure the shear plate, the respective discrete mounting block, and the vehicle frame to each other; the plurality of walls comprise transverse walls that are transverse to the shear plate, the transverse walls have different thicknesses; the plurality of walls of each mounting block comprise a lower horizontal wall, an upper horizontal wall, and at least three transverse walls, each transverse wall spanning between the upper and lower horizontal walls and having an outboard edge facing outboard relative to the vehicle; each transverse wall is substantially perpendicular to the lower and upper horizontal walls; a foam material is disposed within one or more cavities; and the discrete mounting blocks are angled in a rearward direction relative to a horizontal axis extending in a transverse direction of the vehicle.

In another form, the present disclosure provides a mounting structure for mounting a battery tray to a frame of a vehicle. The mounting structure includes a shear plate, a plurality of discrete mounting blocks, and tray fasteners. The shear plate extends in a longitudinal direction of the vehicle. The plurality of discrete mounting blocks are mounted onto the shear plate between the shear plate and a bottom cover of the battery tray. Each mounting block of the plurality of discrete mounting blocks includes a plurality of walls that define one or more cavities. Each tray fastener extends through the shear plate and a respective discrete mounting block of the plurality of discrete mounting blocks and is configured to extend through the battery tray to secure the shear plate, the respective discrete mounting block, and the battery tray to each other. The discrete mounting blocks includes a set of left mounting blocks located on a left side side of the shear plate and a set of right mounting blocks located on a right side of the shear plate. Each left mounting block is laterally aligned with a respective right mounting block.

In yet another form, the present disclosure provides a vehicle that includes a vehicle frame, a battery tray and a mounting structure. The vehicle frame comprises a pair of spaced apart frame rails extending lengthwise in a longitudinal direction of the vehicle. The mounting structure is secured to the vehicle frame and the battery tray and comprises a shear plate and a plurality of discrete mounting blocks. The shear plate extends in the longitudinal direction of the vehicle. The plurality of discrete mounting blocks are mounted onto the shear plate between the shear plate and the battery tray. Each mounting block of the plurality of discrete mounting blocks comprises a plurality of walls that define one or more cavities. The plurality of discrete mounting blocks comprises a set of left mounting blocks located proximate a left side of the shear plate and a set of right mounting blocks located proximate a right side of the shear plate.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
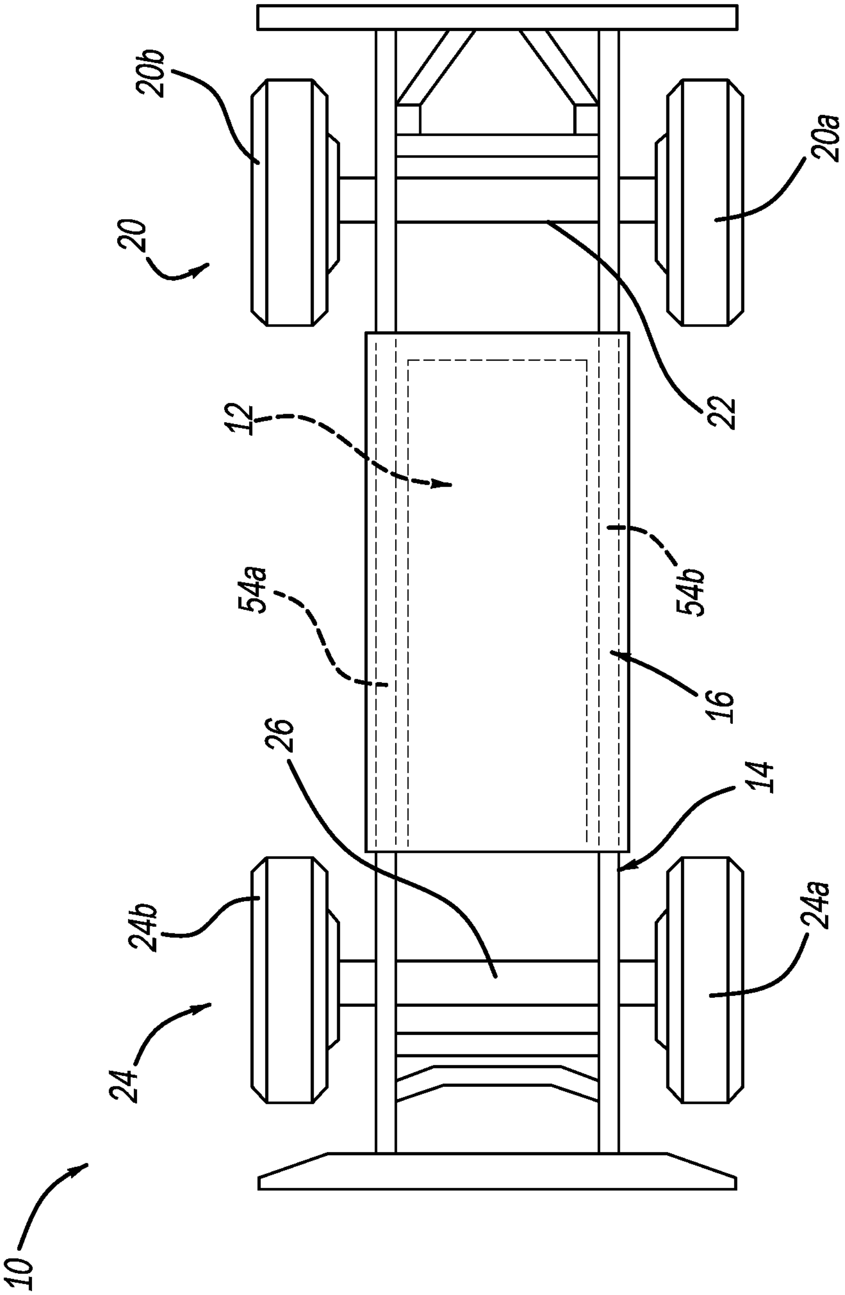
FIG. 1 is a schematic view of a vehicle including a battery pack and a battery pack mounting structure according to the principles of the present disclosure.
Figure 7A:
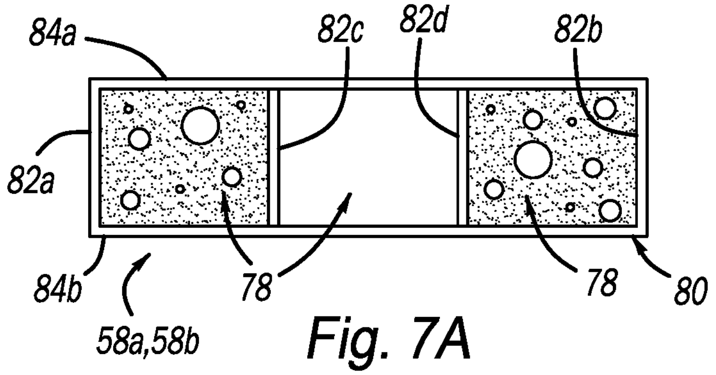
FIG. 7A is a side view of mounting blocks of the mounting structure of FIG. 1.
Figure 7B:
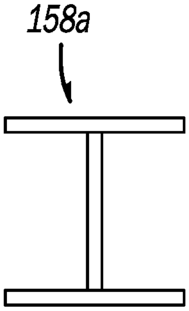
Figure 7C:
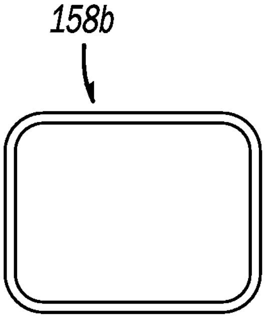
Figure 7D:
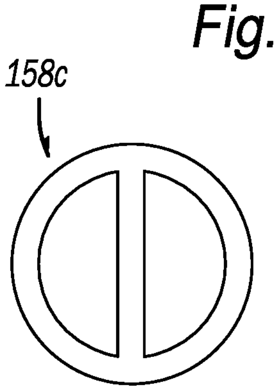
Figure 7E:
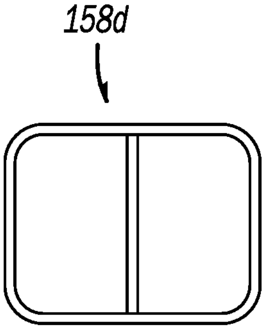
Figure 7F:
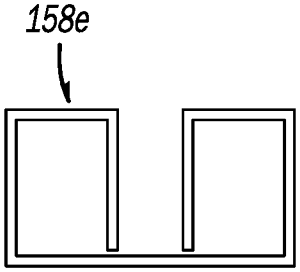
Figure 7G:
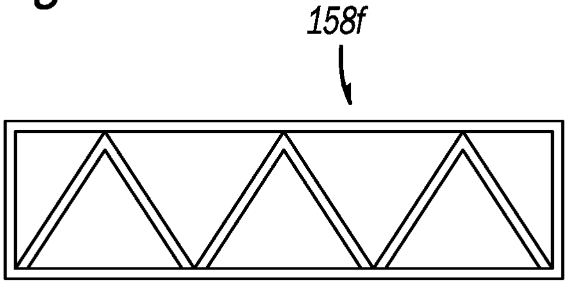
Figure 8:
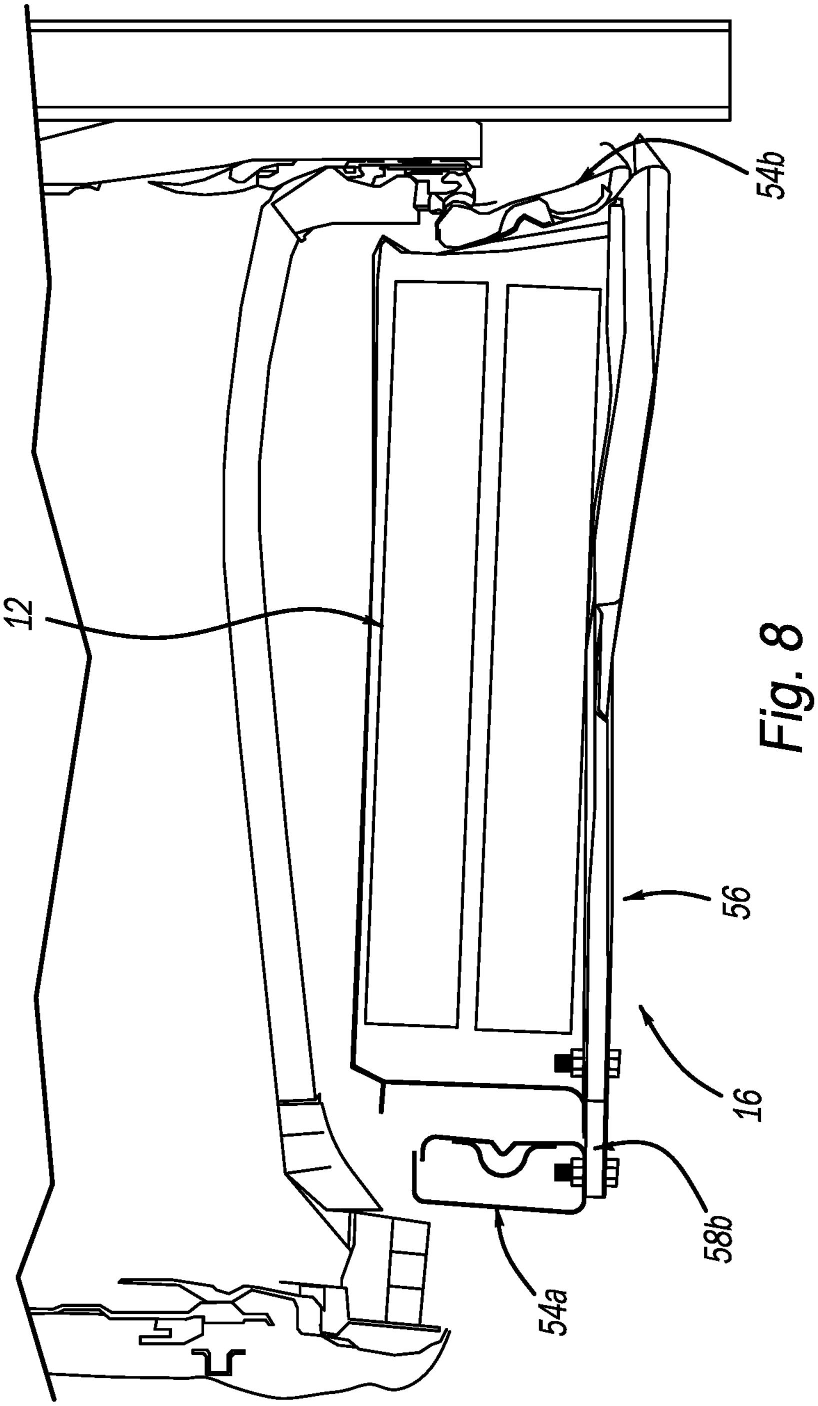

FIGS. 7*b*-7*g* are side views of alternative mounting blocks of the battery pack mounting structure, in accordance with the teachings of the present disclosure; and FIG. 8 is a cross-sectional view of the battery pack mounting structure and the battery pack of FIG. 1 during an impact event.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
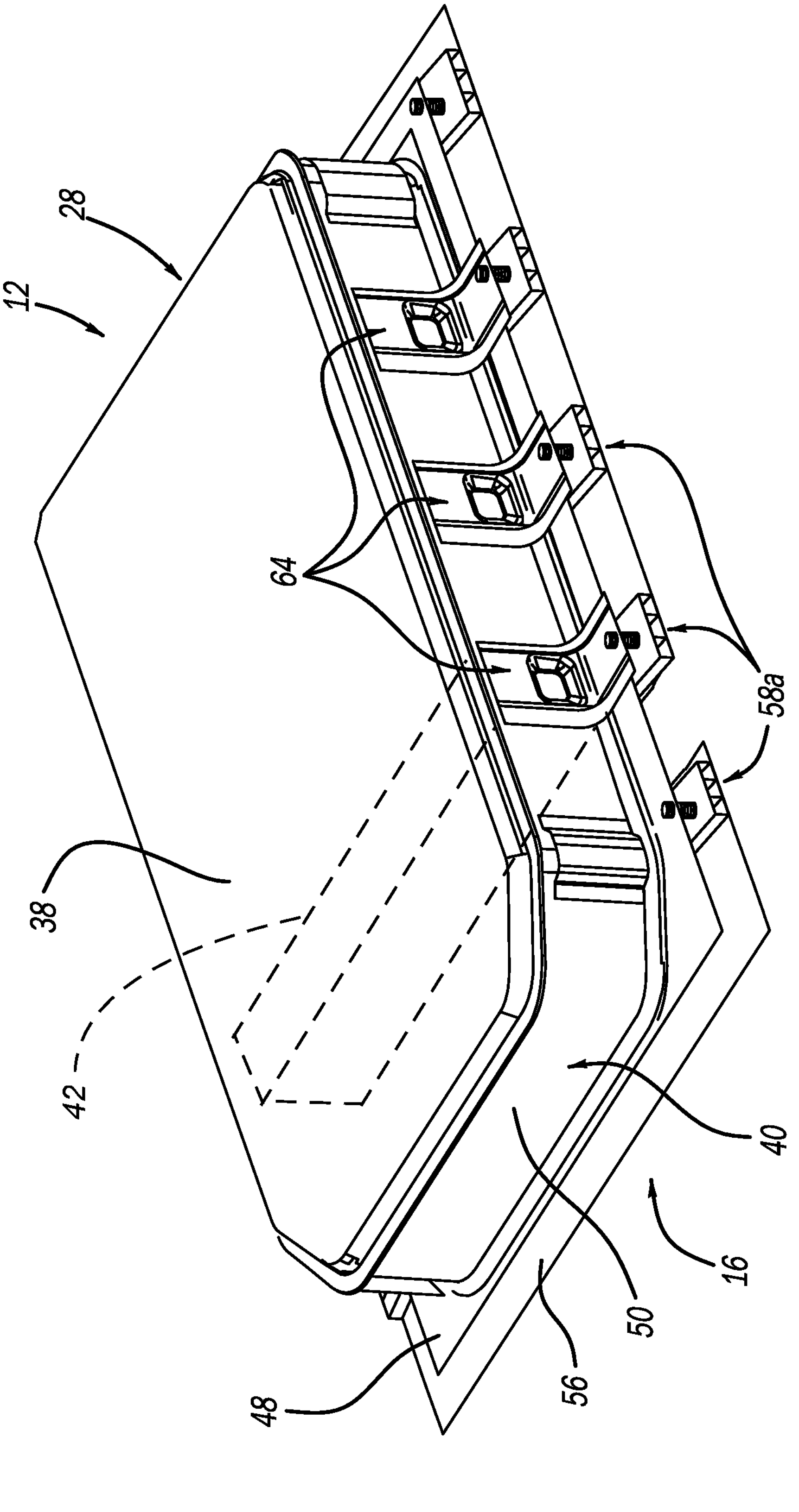
FIG. 2 is a perspective view of the battery pack mounting structure and the battery pack of FIG. 1.
Figure 3:
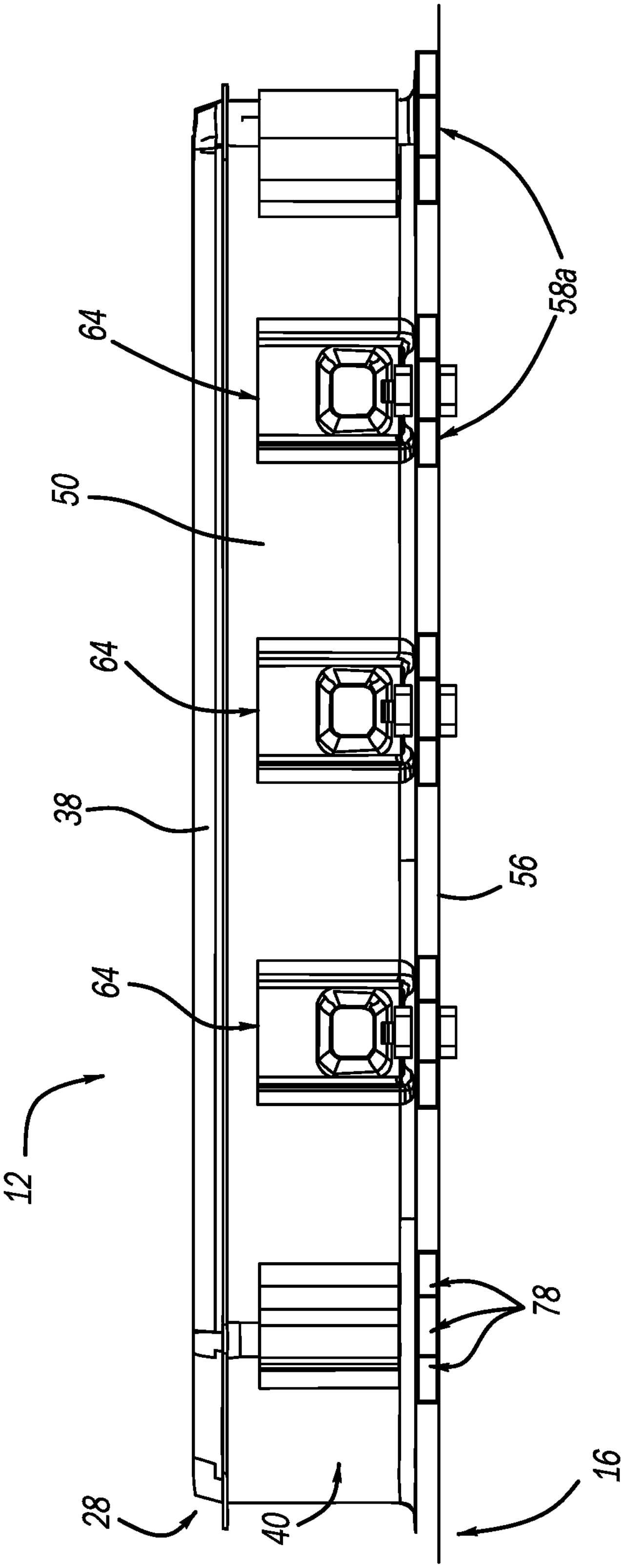
FIG. 3 is a side view of the battery pack mounting structure and the battery pack of FIG. 1.
Figure 4:
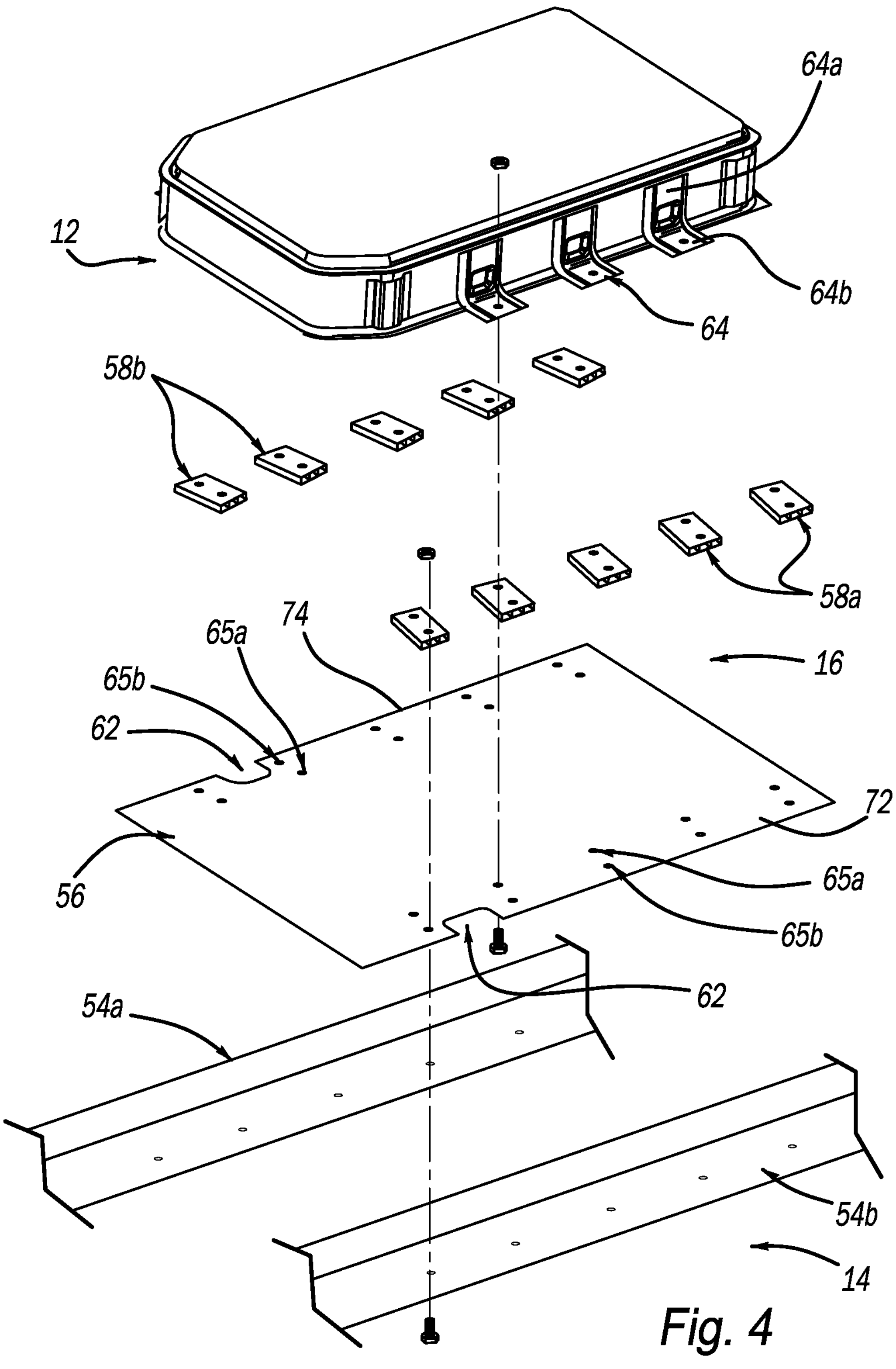
FIG. 4 is an exploded perspective view of the battery pack mounting structure and the battery pack of FIG. 1.
Figure 5:
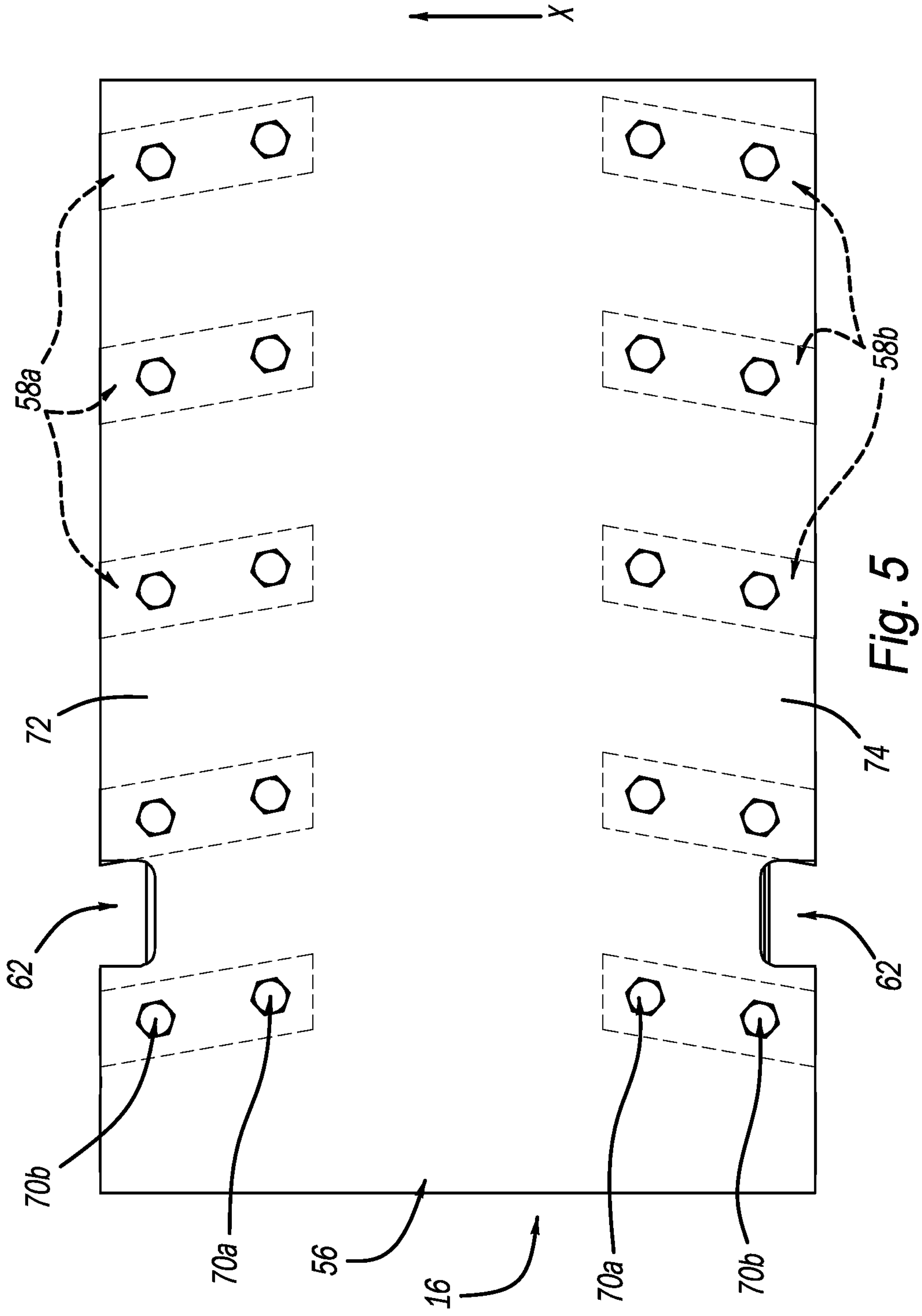
FIG. 5 is a bottom view of the battery pack mounting structure of FIG. 1.
Figure 6:
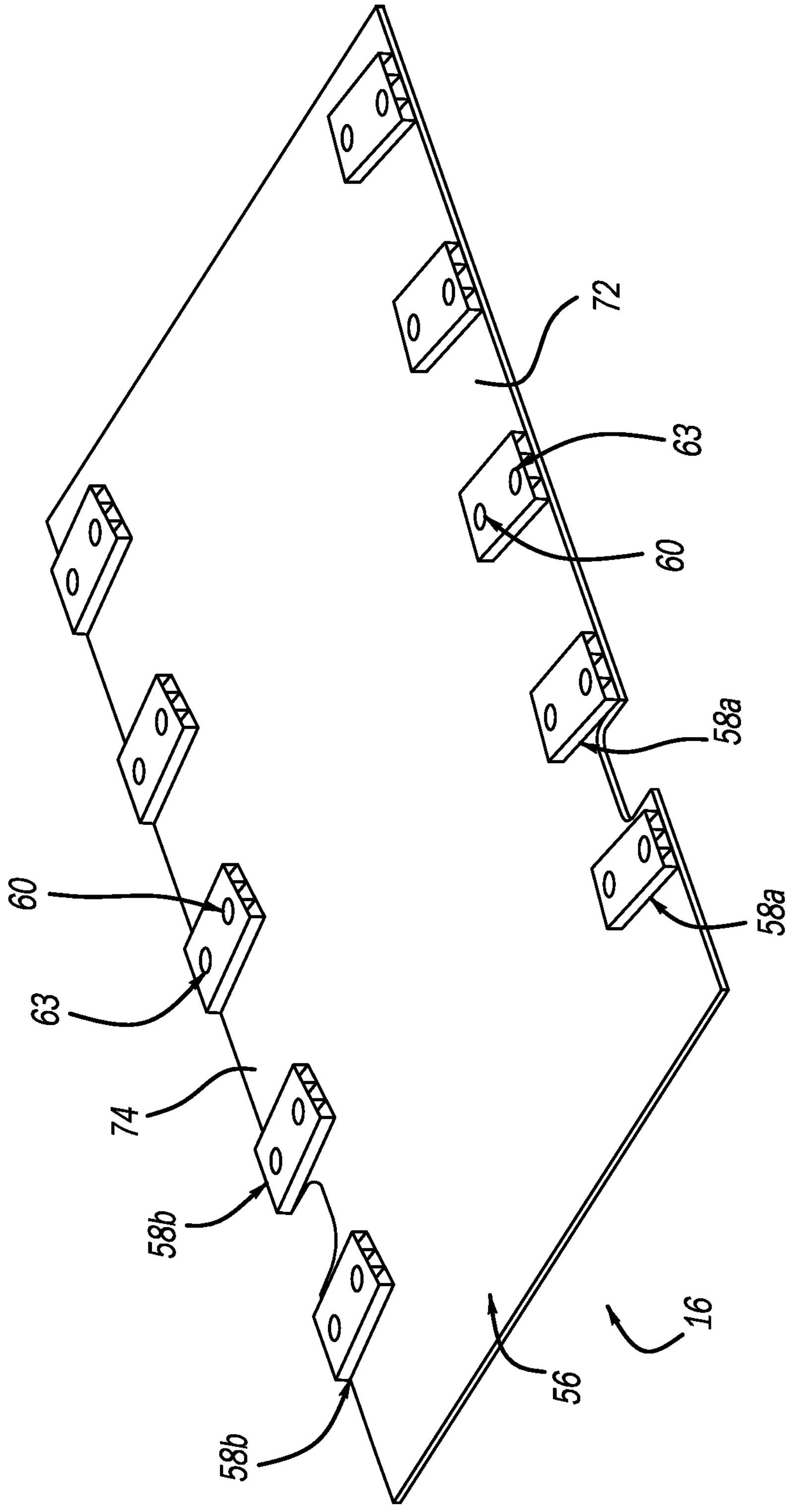
FIG. 6 is a perspective view of the battery pack mounting structure of FIG. 1.

With reference to FIGS. 1 and 2, a vehicle 10 (FIG. 1) such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a battery housing assembly 12 (also referred to herein as a battery pack), a vehicle frame 14 (FIG. 2) and a battery mounting structure 16 (FIG. 2; also referred to herein as a battery pack mounting structure). The battery housing assembly 12 powers one or more motors to drive a set of drive wheels. For example, the battery housing assembly 12 may power a rear motor (not shown) to drive rear wheels 20*a*, 20*b* of a set of rear wheels 20 via a rear axle 22 and/or may power a front motor (not shown) to drive front wheels 24*a*, 24*b* of a set of front wheels 24 via a front axle 26.

The battery housing assembly 12 includes one or more battery arrays (not shown) and a battery tray or housing 28. The battery housing 28 is an enclosure which provides a structural surrounding and sealed compartment for the battery arrays and other battery components such as cooling lines, support brackets, and wiring disposed therein. The battery arrays may be rechargeable and may include lithium-ion batteries or any other suitable electrical power storage units. In some forms, the battery arrays are stacked on top of each other.

The battery housing 28 may be disposed at various locations of the vehicle 10 and is mounted to the vehicle frame 14. In this way, the battery housing 28 is supported by the vehicle frame 14 and is remote from a passenger cabin (not shown) and cargo compartments (not shown) of the vehicle 10, therefore, not occupying space that would otherwise be available for passengers or cargo. The battery housing 28 includes a lid 38, a body 40, and internal cross members 42 (only one schematically illustrated in dashed lines in FIG. 2 for ease of illustration). The lid 38 at least partially overlaps the body 40 and is removably coupled to the body 40 via mechanical fasteners such as bolts or screws (not shown), for example. In this way, the lid 38 may be removed to service the battery arrays disposed within the battery housing 28.

The body 40 includes a bottom wall or panel 48 (FIG. 2) and one or more side walls or panels 50. The bottom wall 48 supports the battery arrays disposed within the battery housing 28 and is secured to lower portions of the side walls 50. For example, the bottom wall 48 is secured to the lower portions of the side walls 50 via welding, an adhesive, or any other suitable attachment means. The side walls 50 are manufactured via stamping, for example, and extend in a vertical direction. The side walls 50 define an outer boundary of the body 40 and are secured to each other via welding or an adhesive, for example. A seal (not shown) is disposed around a periphery of the side walls 50 of the battery housing 28 and is engaged with side walls 50 and the lid 38. In this way, fluids, debris and other materials are inhibited from entering into the battery housing 28. The internal cross members 42 are disposed within the body 40 and extend in a transverse direction of the vehicle 10. The internal cross members 42 may connect opposed side walls 50. The internal cross members 42 abut against the bottom wall 48 of the body 40 and are spaced apart along a longitudinal direction of the vehicle 10.

The vehicle frame 14 is the main supporting structure of the vehicle 10, to which various components are attached either directly or indirectly. The vehicle frame 14 includes opposed longitudinal rails 54*a*, 54*b*. The rails 54*a*, 54*b* are spaced apart from each other and may establish a length of the vehicle frame 14.

With reference to FIGS. 2-7, the battery mounting structure 16 is secured to the vehicle frame 14 and the battery housing 28 such that the mounting structure 16, the vehicle frame 14, and the battery housing 28 are combined into a unitized structure. In this way, the mounting structure 16 mounts the battery housing 28 to the vehicle frame 14 and reduces bending of the longitudinal rails 54*a*, 54*b* during a vehicle impact event. The mounting structure 16 protects the battery housing assembly 12 during vehicle operation and comprises a shear plate 56 and a plurality of mounting blocks 58*a*, 58*b*.

In the example illustrated, the shear plate 56 is a rectangular stamping with a flat, thin profile and is spaced apart from the bottom wall 48 of the battery housing 28. The shear plate 56 extends along a longitudinal direction of the vehicle 10 and covers the bottom wall 48 and extends outboard of the battery housing assembly 12. Stated differently, the shear plate 56 has a surface area that is greater than a surface area of the bottom wall 48 of the battery housing 28. The shear plate 56 is secured to the bottom wall 48 and the longitudinal rails 54*a*, 54*b* of the vehicle frame 14 by the mounting blocks 58*a*, 58*b*. The shear plate 56 is made of a metal material and includes opposing sides that may have one or more cutouts 62 formed therein. In this way, handling and assembling the shear plate 56 to the battery housing 28 and the vehicle frame 14 is facilitated. In the example illustrated, the cutouts 62 have a generally rectangular shape. In other forms, the cutouts 62 include other suitable shapes such as square or semi-circular, for example.

The plurality of mounting blocks 58*a*, 58*b* may be manufactured from a hot roll process, for example, and are made of a metal material such as steel or high strength steel, for example. The plurality of mounting blocks 58*a*, 58*b* are mounted onto the shear plate 56 at respective sides of the shear plate 56 and are positioned between the shear plate 56 and the bottom wall 48 of the battery housing 28. The mounting blocks 58*a*, 58*b* are unattached from each other and are not integrally formed with each other. Stated differently, the mounting blocks 58*a*, 58*b* are separate and discrete components located at respective sides of the shear plate 56 (i.e., the mounting blocks 58*a*, 58*b* do not extend in a transverse direction along a substantial width of the shear plate 56 and, unlike conventional cross bars, the mounting blocks 58*a* or 58*b* on one side do not extend in the transverse direction across the central longitudinal axis of the vehicle to the other side).

Brackets 64 are secured to a respective sidewall 50 of the battery housing 28 and are spaced apart along a longitudinal direction of the vehicle 10. The brackets 64 have a generally L-shape and include a vertical extending portion 64*a* and a horizontal extending portion 64*b*. The vertical extending portion 64*a* is secured to the respective sidewall 50 of the battery housing 28 and the horizontal extending portion 64*b* is secured to the top of a respective mounting block 58*a*, 58*b* such that the mounting block 58*a*, 58*b* is between the horizontal extending portion 64*b* and the shear plate 56, with the shear plate 56 being between the mounting block 58*a*, 58*b* and a respective longitudinal rail 54*a*, 54*b*. In the example illustrated, the vertical extending portion 64*a* is welded to the respective side wall 50 of the battery housing 28. In some forms, the vertical extending portion 64*a* is attached to the respective side wall 50 of the battery housing 28 by mechanical fasteners, for example.

In the example illustrated, each mounting block 58*a*, 58*b* is welded to the shear plate 56 and is vertically aligned with a respective internal cross member 42 of the battery housing 28. Each mounting block 58*a*, 58*b* is also secured to a respective longitudinal rail 54*a*, 54*b* and the battery housing 28 via fasteners 70*a*, 70*b*. That is, the fastener 70*a* extends through an aperture 65*a* in the shear plate 56, an aperture 60 in a respective mounting block 58*a*, 58*b*, the bottom wall 48 of the battery housing 28 and a respective internal cross member 42, thereby securing the shear plate 56, the respective mounting block 58*a*, 58*b* and the battery housing 28 to each other. Similarly, the fastener extends through an aperture 65*b* in the shear plate 56, an aperture 63 in the respective mounting block 58*a*, 58*b*, the horizontal extending portion 64*b* of a respective bracket 64 and a respective longitudinal rail 54*a*, 54*b*, thereby securing the shear plate 56, the respective mounting block 58*a*, 58*b*, the respective bracket 64 and the respective longitudinal rail 54*a*, 54*b* to each other outboard of the battery housing assembly 12. In some forms, each mounting block 58*a*, 58*b* is welded to a bottom surface of the bottom wall 48 of the battery housing 28 and is secured to the respective longitudinal rail 54*a*, 54*b* and the shear plate 56 via the fasteners 70*b* as described above.

The mounting blocks 58*a* are located on a first side 72 of the shear plate 56 and the mounting blocks 58*b* are located on an opposing second side 74 of the shear plate 56. The mounting blocks 58*a* are aligned with each other along the longitudinal direction of the vehicle 10 and the mounting blocks 58*b* are aligned with each other along the longitudinal direction of the vehicle 10. Each mounting block 58*a* is also laterally or horizontally aligned with a respective mounting block 58*b* located on the second side 74. In the example illustrated, the mounting blocks 58*a*, 58*b* have a parallelogram shape and are angled in a rearward direction with respect to a horizontal axis X (FIG. 5) extending in a transverse direction of the vehicle 10 such that a portion of an outboard end of each mounting block 58*a*, 58*b* is forward of an inboard end of that mounting block 58*a*, 58*b*. In some forms, the mounting blocks 58*a*, 58*b* are angled in a forward direction with respect to the horizontal axis X such that a portion of the inboard end of each mounting block 58*a*, 58*b* is forward of the outboard end of that mounting block 58*a*, 58*b*. In other forms, the mounting blocks 58*a*, 58*b* have a rectangular shape and extend parallel with respect to the horizontal axis X.

As best shown in FIG. 7*a*, each mounting block 58*a*, 58*b* of the mounting blocks 58*a*, 58*b* comprise one or more cavities 78 defined by a plurality of walls 80 extending in a transverse direction of the vehicle 10. In the example illustrated, three cavities 78 are defined by the walls 80 (comprising vertical walls 82*a*, 82*b*, 82*c*, 82*d* and horizontal walls 84*a*, 84*b*). The vertical walls 82*a*, 82*b*, 82*c*, 82*d* are spaced apart from each other and extend from horizontal wall 84*a* to horizontal wall 84*b*. The vertical walls 82*a*, 82*b* define an outer periphery of the mounting blocks 58*a*, 58*b* and the vertical walls 82*c*, 82*d* are positioned between the vertical walls 82*a*, 82*b*. In the example illustrated, the walls 80 have equal thicknesses. In some forms, one or more walls may have different thicknesses relative to the other walls. For example, the vertical walls 82*a*, 82*b*, 82*c*, 82*d* may have a thickness that is greater than the horizontal walls 84*a*, 84*b*. In another example, the vertical walls 82*a*, 82*b*, 82*c*, 82*d* may have different thicknesses relative to each other. In some forms, each wall 82*a*, 82*b*, 82*c*, 82*d*, 84*a*, 84*b* may have a variable thickness.

In the example illustrated, an optional foam material is provided within one or more cavities 78 to provide additional stiffness of the mounting blocks 58*a*, 58*b* during vehicle operation. In some forms, the mounting blocks 58*a*, 58*b* include one or more oblique walls, in addition to, or instead of, the vertical walls 82*a*, 82*b*, 82*c*, 82*d*.

Although the figures show the mounting blocks 58*a*, 58*b* with four (4) vertical walls and two (2) horizontal walls, in some forms, the mounting blocks 58*a*, 58*b* may have more or less verticals walls and horizontal walls. As shown in FIG. 7*b*, the mounting block 158*a* has one vertical wall extending between two horizontal walls. As shown in FIG. 7*c*, the mounting block 158*b* has two vertical walls extending between two horizontal walls. There may also include radii at the intersection between one vertical wall and one horizonal wall. As shown in FIG. 7*d*, the mounting block 158*c* has a circular shape and comprises one vertical wall positioned between two arcuate outer walls. As shown in FIG. 7*e*, the mounting block 158*d* has three vertical walls extending between two horizontal walls. As shown in FIG. 7*f*, the mounting block 158*e* has four vertical walls, a continuous lower horizontal wall and a discontinuous upper horizontal wall. The opening in the discontinuous upper horizontal wall may be closed by the bottom wall 48 of the battery housing 28 or the shear plate 56 once the mounting block 158*e* is secured to the battery housing 28 and the shear plate 56. As shown in FIG. 7*g*, the mounting block 158*f* has two end vertical walls, two horizontal walls, and a plurality of oblique internal walls cooperating with each other to form a corrugated pattern.

The walls 80 of the mounting blocks 58*a*, 58*b* of the present disclosure are oriented such that the impact forces strike edge-wise on the walls 80 so that the walls 80 transfer the load from the vehicle impact in compression along the walls 80 longest axis. As shown in FIG. 8, the mounting structure 16 including the mounting blocks 58*a*, 58*b* located at the outer boundary of the battery housing 28 and secured to the longitudinal rails 54*a*, 54*b* and the battery housing 28 as described above provides bending and/or twisting resistance of the longitudinal rails 54*a*, 54*b* during the vehicle impact. Further, the construction of the mounting blocks 58*a*, 58*b* also reduces the weight of the mounting structure 16 compared to traditional battery pack mounting structures.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A mounting structure for mounting a battery tray to a frame of a vehicle, the mounting structure comprising:

a shear plate extending in a longitudinal direction of the vehicle; and a plurality of separate mounting blocks mounted onto the shear plate between the shear plate and a bottom cover of the battery tray, wherein each mounting block of the plurality of separate mounting blocks comprises a plurality of walls that define one or more cavities, wherein the plurality of separate mounting blocks comprises a set of first mounting blocks located proximate a first side of the shear plate and a set of second mounting blocks located proximate a second side of the shear plate that is opposite the first side of the shear plate.

2. The mounting structure of claim 1, wherein the first mounting blocks are aligned with each other in the longitudinal direction of the vehicle and the second mounting blocks are aligned with each other in the longitudinal direction of the vehicle.

3. The mounting structure of claim 1, wherein the first side corresponds to a left side of the vehicle and the second side corresponds to a right side of the vehicle, wherein each first mounting block is laterally aligned with a respective second mounting block that is located on an opposite side of a longitudinal axis of the vehicle.

4. The mounting structure of claim 1, further comprising a plurality of fasteners, each fastener extending through the shear plate and a respective mounting block of the plurality of separate mounting blocks and configured to extend through the bottom cover of the battery tray to secure the shear plate, the respective mounting block, and the battery tray to each other.

5. The mounting structure of claim 1, further comprising:

a plurality of tray fasteners, each tray fastener extending through the shear plate and a respective mounting block of the plurality of separate mounting blocks and configured to extend through the bottom cover of the battery tray to secure the shear plate, the respective mounting block, and the battery tray to each other; and a plurality of frame fasteners, each frame fastener extending through the shear plate and a corresponding mounting block of the plurality of separate mounting blocks and configured to extend through a longitudinal rail of a vehicle frame to secure the shear plate, the respective mounting block, and the vehicle frame to each other.

6. The mounting structure of claim 1, wherein the plurality of walls comprise transverse walls that are transverse to the shear plate, and wherein the transverse walls have different thicknesses.

7. The mounting structure of claim 1, wherein the plurality of walls of each mounting block comprise a lower horizontal wall, an upper horizontal wall, and at least three transverse walls, each transverse wall spanning between the upper and lower horizontal walls and having an outboard edge facing outboard relative to the vehicle.

8. The mounting structure of claim 7, wherein each transverse wall is substantially perpendicular to the lower and upper horizontal walls.

9. The mounting structure of claim 1, wherein a foam material is disposed within the one or more cavities.

10. The mounting structure of claim 1, wherein the discrete mounting blocks are angled in a rearward direction relative to a horizontal axis extending in a transverse direction of the vehicle.

11. A mounting structure for mounting a battery tray to a frame of a vehicle, the mounting structure comprising:

a shear plate extending in a longitudinal direction of the vehicle;

a plurality of separate mounting blocks mounted onto the shear plate between the shear plate and the battery tray, wherein each mounting block comprises a plurality of walls that define one or more cavities; and a tray fastener extending through the shear plate and a respective mounting block of the plurality of separate mounting blocks and configured to extend through the battery tray to secure the shear plate, the respective mounting block, and the battery tray to each other, wherein the mounting blocks comprise a set of left mounting blocks located on a left side of the shear plate and a set of right mounting blocks located on a right side of the shear plate, each left mounting block laterally aligned with a respective right mounting block.

12. The mounting structure of claim 11, wherein the left mounting blocks are longitudinally aligned with each other and the right mounting blocks are longitudinally aligned with each other.

13. The mounting structure of claim 11, further comprising a frame fastener extending through the shear plate and the respective mounting block and configured to extend through a longitudinal rail of a vehicle frame to secure the shear plate, the respective mounting block, and the vehicle frame to each other.

14. The mounting structure of claim 11, wherein the plurality of walls comprise transverse walls, and wherein the transverse walls have different thicknesses.

15. The mounting structure of claim 14, wherein the plurality of walls of each mounting block comprise a lower horizontal wall, an upper horizontal wall, and at least three transverse walls, each transverse wall spanning between the upper and lower horizontal walls and having an outboard edge facing outboard relative to the vehicle.

16. The mounting structure of claim 11, wherein each transverse wall is substantially perpendicular to the lower and upper walls.

17. The mounting structure of claim 11, wherein a foam material is disposed within the one or more cavities.

18. A vehicle comprising:

a vehicle frame comprising a pair of spaced apart frame rails extending lengthwise in a longitudinal direction of the vehicle;

a battery tray; and a mounting structure secured to the vehicle frame and the battery tray, the mounting structure comprising:

a shear plate extending in the longitudinal direction of the vehicle; and a plurality of separate mounting blocks mounted onto the shear plate between the shear plate and the battery tray, wherein each mounting block of the plurality of separate mounting blocks comprises a plurality of walls that define one or more cavities, wherein the plurality of separate mounting blocks comprises a set of left mounting blocks located proximate a left side of the shear plate and a set of right mounting blocks located proximate a right side of the shear plate.

19. The vehicle of claim 18, wherein the left mounting blocks are longitudinally aligned with each other and the right mounting blocks are longitudinally aligned with each other.

20. The vehicle of claim 18, further comprising:

a plurality of tray fasteners, each tray fastener extending through the shear plate, a respective mounting block of the plurality of separate mounting blocks and the battery tray; and a plurality of frame fasteners, each frame fastener extending through the shear plate, a corresponding mounting block of the plurality of separate mounting blocks and a respective frame rail of the pair of spaced apart frame rails.

* * * * *